United States Patent
Wyser

Patent Number: 6,159,630
Date of Patent: Dec. 12, 2000

[54] SAFETY VENT FOR STORAGE BATTERY OR CELL

[75] Inventor: Paul Julian Wyser, Appenzell, Switzerland

[73] Assignee: Renata AG, Itingen, Switzerland

[21] Appl. No.: 09/275,884

[22] Filed: Mar. 25, 1999

[30] Foreign Application Priority Data

Mar. 30, 1998 [EP] European Pat. Off. ............ 98105760

[51] Int. Cl.[7] .................................................. H01M 10/34
[52] U.S. Cl. ........................... 429/57; 429/62; 429/65; 429/129; 429/163; 429/185
[58] Field of Search ................. 429/57, 59, 163, 429/175, 176, 181, 185, 82, 53, 62, 65, 129, 130

[56] References Cited

U.S. PATENT DOCUMENTS

| | | | |
|---|---|---|---|
| 4,049,883 | 9/1977 | Schenk et al. | 429/94 |
| 4,397,919 | 8/1983 | Ballard | 429/53 |
| 4,539,274 | 9/1985 | Goebel | 429/94 |
| 4,810,598 | 3/1989 | Levy et al. | 429/59 |
| 4,908,282 | 3/1990 | Badger | 429/59 |
| 4,925,746 | 5/1990 | Pavlov et al. | 429/57 |
| 4,977,043 | 12/1990 | Kadouchi et al. | 429/54 |
| 5,455,125 | 10/1995 | Matsumoto et al. | 429/59 |
| 5,537,733 | 7/1996 | Kozawa et al. | 29/623.5 |
| 5,543,244 | 8/1996 | Klink et al. | 429/57 |
| 5,744,259 | 4/1998 | Ohta et al. | 429/59 |
| 5,786,108 | 7/1998 | Sprengel et al. | 429/178 |

FOREIGN PATENT DOCUMENTS

| | | |
|---|---|---|
| 1144757 | 6/1985 | European Pat. Off. |
| 0772251 A1 | 5/1997 | European Pat. Off. |
| 57-163965 | 10/1982 | Japan . |
| 60-249241 | 12/1985 | Japan . |
| 6-333544 | 12/1994 | Japan . |

Primary Examiner—Stephen Kalafut
Assistant Examiner—Raymond Alejandro
Attorney, Agent, or Firm—Pollock, Vande Sande & Amernick

[57] ABSTRACT

Safety vent for a battery, sensitive to an abnormal rise in temperature, closed by a cover (4), separated from the active materials by an insulating element (21) and carrying two contact terminals (7, 8) electrically connected to the electrodes via connection means (5, 6), wherein at least one of the contact terminals (7, 8) is formed at least partially by a rigid metal rod (30), mounted with an annular clearance (18) in a tube (11) of which one portion (11a) of smaller diameter passes through the insulating element (21) and the cover (4), and of which a portion (11b) of larger diameter rests on the inner face (21a) of the insulating element (21), the other end (13) thereof being crimped over the outer face (4b) of the cover (4) and in that the clearance (18) formed between the tube (11) and the rod (30) is sealed by a thermofusible composition (14).

14 Claims, 2 Drawing Sheets

SAFETY VENT FOR STORAGE BATTERY OR CELL

The present invention concerns a safety vent for a storage battery or cell, sensitive to an abnormal rise in temperature. The invention particularly concerns such storage batteries or cells of the lithium-ion type.

With the expansion of portable equipment, requiring high power density, such as mobile telephones, video cameras and other electronic apparatus, it has been sought to develop storage batteries or cells, designated hereinafter by the generic term <<battery>>, whether or not the power source is rechargeable, having amongst other desired features, a high power density, while providing, at the lowest cost possible, all necessary guarantees from the safety point of view, as regards both the user and the contiguous electronic circuits. During the last decades, batteries of the lithium-ion type, whether rod, button or prism shaped, have seen significant development, because of their aptitude for providing high power density. Improvements to this type of battery have concerned both the choice of the best couple with the lithium ion and devices aimed at improving their safety of use. When the battery is in a closed circuit with a high current demand, during the charging phase for storage batteries, or during a malfunction due to improper use for example during use or storage at too high a temperature, the chemical reactions which are generated can cause partial decomposition of the electrolyte with a release of gas leading to an increase of pressure inside the battery container and a rise in temperature, which can cause an explosion, or even ignition of the battery. In order to overcome this drawback, most batteries are fitted with a safety device which exploits this internal pressure, or more precisely which triggers the device beyond a certain pressure threshold. By way of example, European Patent No. 0 554 535 discloses a device wherein the pressure causes the opening of a valve, which is normally kept closed by the mechanical pressure exerted by an elastic washer. In U.S. Pat. No. 4,943,497, the device described consists in causing the breakage of the connection means between the external contact terminals and the active material within the battery container.

Such devices rely upon mechanical constructions which have the drawback of increasing the final cost.

For lithium-ion batteries of large dimensions, various devices aim either to dissipate the heat, such as the device described in European Patent No. 0 620 610, or to use it to melt a plug arranged in the wall of the container, such as the device described In U.S. Pat. No. 4,232,796. For batteries of small dimensions intended for portable apparatus incorporating fragile electronic circuits, it is clear that such a device is not satisfactory given that it is not possible to confine the inevitable electrolyte leakage.

An object of the present invention is to overcome the aforementioned drawbacks by providing a battery which includes a safety vent around an external contact terminal, without thereby increasing the cost of the final product.

The invention therefore concerns a safety vent, sensitive to an abnormal rise in temperature, for a battery including a metal container within which are arranged active materials forming respectively the anode and the cathode, said container being sealed at its upper portion by a hermetically sealed cover, separated from the active materials by an insulating element and carrying two contact terminals electrically connected to the anode and the cathode via connection means, characterised in that at least one of the contact terminals is formed at least partially by a rigid metal rod, mounted with an annular clearance in a tube of which one portion of smaller diameter passes through the insulating element and the cover, and of which a portion of larger diameter rests on the inner face of the insulating element, the other end thereof being crimped over the outer face of the cover and in that the clearance formed between the tube and the rod is sealed by a thermofusible composition.

When the battery is used in conditions causing a rise in temperature and internal pressure which pose a risk of explosion and ignition of the accumulated gases, the thermofusible composition melts and allows release of the gases through the passage arranged by the clearance which initially exists between the rod and the portion of tube of smaller diameter. According to known techniques of the prior art, the gas emitted can be confined or passivated to remove any risk of ignition. The safety vent according to the invention can also be completed by circuit-breaking devices when the power demand exceeds a critical threshold, such as an integrated electronic circuit extending a contact terminal and allowing the state of charge/discharge of the battery to be monitored as well as any abnormal demand for power coverable of compromising the safety of use. The thermofusible composition is provided to melt and release the passage when the temperature reaches 100° to 150° C., i.e. around 120° C. For this purpose, known eutectic alloys of metals selected from among bismuth, cadmium, tin, indium and lead can be used.

Crimping of the tube onto the cover is preferably achieved by inserting an insulating washer between the cover and the crimped portion of tube, which allows the external contact terminal of the cover to be electrically insulated, provided an annular space has been arranged between said cover and the tube. In order to reinforce the sealing of the battery when it is used in a normal operating state, it can also be advantageous to provide a sealing gasket arranged in a housing in the cover and allowing said gasket to be pressed against the cover, the insulating element and the tube during the crimping operation.

It is also possible, and economically preferable, to realise the electric insulation and sealing at the same time by means of a single part which is both insulating and resilient. This part includes a tubular portion arranged between the cover and the tube, resting on the insulating element by one of the ends thereof, the other end thereof being extended by an annular extension forming a washer.

The electric connection between a contact terminal provided with such a vent and an electrode situated within the battery can be effected with flexible conductors in accordance with known techniques of the prior art.

According to two preferred embodiments, the rod or tube can also form the connection means to the electrodes.

According to a first embodiment, the tube is limited to a sleeve whose shoulder forms a flange resting on the inner face of the insulating element, the connection rod being extended within the battery beyond the insulating element to be welded without any intermediate contact to the electrodes.

According to a second embodiment, the connection rod does not extend beyond the insulating element and the portion of tube of larger diameter is extended within the battery to be welded to the electrodes. In order to allow the gases to flow freely, the tube is provided with an opening in the portion thereof of larger diameter, close to the shoulder.

According to one or the other of the embodiments, the rod or tube portions extending within the battery are flattened, at least partially to facilitate welding of the electrodes in mass production.

The safety vent according to the invention can be used in any type of battery. However, according to a preferred embodiment, the insulating element on which the flange of the sleeve rests is the upper flange of a spool supporting a winding of the jelly roll type, i.e. a non-circular spiral winding of composite strips, containing the anode and the cathode. In this embodiment, the spool also includes a lower flange joined to the upper flange by three necks defining two openings allowing the rod portions forming the connection means to be housed in the portion comprised between the two flanges. The invention also concerns a battery provided with a safety vent according to the invention, and more particularly a prismatic battery with a coiled winding of the jelly roll type.

Other features and advantages of the present invention will appear more clearly in the following description with reference to the annexed drawings, in which.

Figure 1:
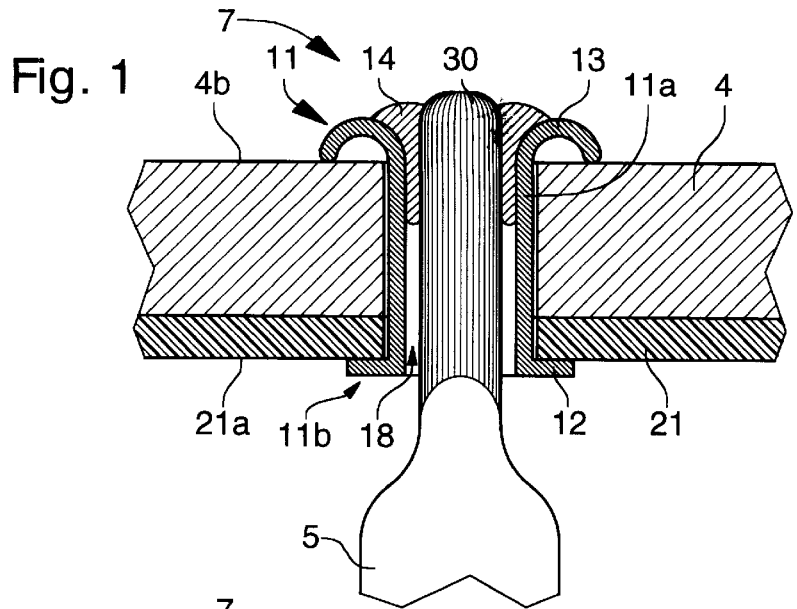
FIG. 1 is a schematic cross-section of a safety vent according to the invention.

FIG. 1 shows only the portion of the battery including the safety vent. The upper portion is a metal cover 4 which has to be welded into the opening of container 1 of the battery (not shown in this Figure, but visible in FIG. 5). Below this cover 4 is arranged an insulating element 21 having substantially the same surface area as cover 4, said insulating element being preferably made of a plastic material able to be deformed. Insulating element 21 and cover 4 are pierced with a hole intended to accommodate a tube 11 of which one portion of smaller diameter 11a passes through insulating element 21 and cover 4 and of which the other portion of larger diameter 11b is limited to a flange 12 resting on the inner face 21a of insulating element 21. The other end 13 of tube 11 is crimped onto outer face 4b of the cover. The end of a metal rod 30 passes through tube 11, said tube being directly or indirectly connected to an electrode of the battery. Rod 30 has a smaller diameter than the inner diameter of tube 11 so that there is an annular clearance 18 between the inner walls of tube 11 and the body of rod 30. This annular clearance 18 is sealed from the exterior by a strand of a thermofusible composition 14 so as to make the battery container hermetic in a normal operating state. Thermofusible composition 14 is preferably a eutectic alloy of metals selected from among tin, bismuth, lead, cadmium and indium; and whose melting point is comprised between 100° C. and 150° C. Such compositions are available commercially for example from Metallwerke Goslar GmbH & Co. KG—Germany. By way of example one can use a composition including 27% cadmium and 73% indium having an eutectic point of 123° C.

In the example which has just been described, it can be seen on the one hand that an electric bridge exists between cover 4 and rod 30, and on the other hand that the sealing of the battery still depends on proper adjustment between the diameter of the hole made through cover 4 and the external diameter of tube 11. The alternative constructions proposed in FIGS. 3 and 4 allow the electric bridge to be removed and sealing to be reinforced.

Figure 2:
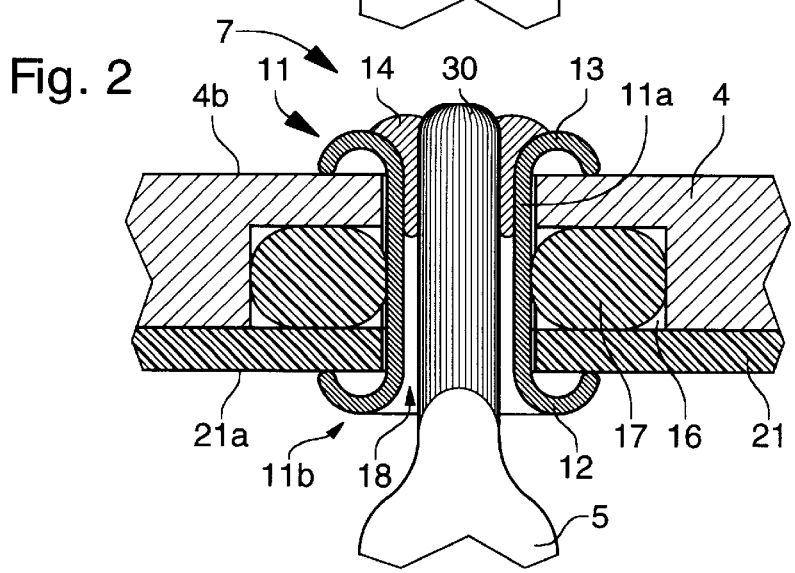
FIG. 2 is a cross-section of a first embodiment of a safety vent according to the invention.

FIG. 2 shows that cover 4 includes an annular recess 16 open towards the interior of the battery container. Prior to putting cover 4 in place and performing the crimping operation, a gasket 17 is placed around sleeve 11, such gasket having a section such that it assures by compression the sealing between cover 4, insulating element 21 and the outer body of the tube. In the embodiment shown in FIGS. 2 and 3, it will also be noted that flange 12 can have the shape of a bulge comparable to that obtained at the other end of the sleeve by crimping.

Figure 3:
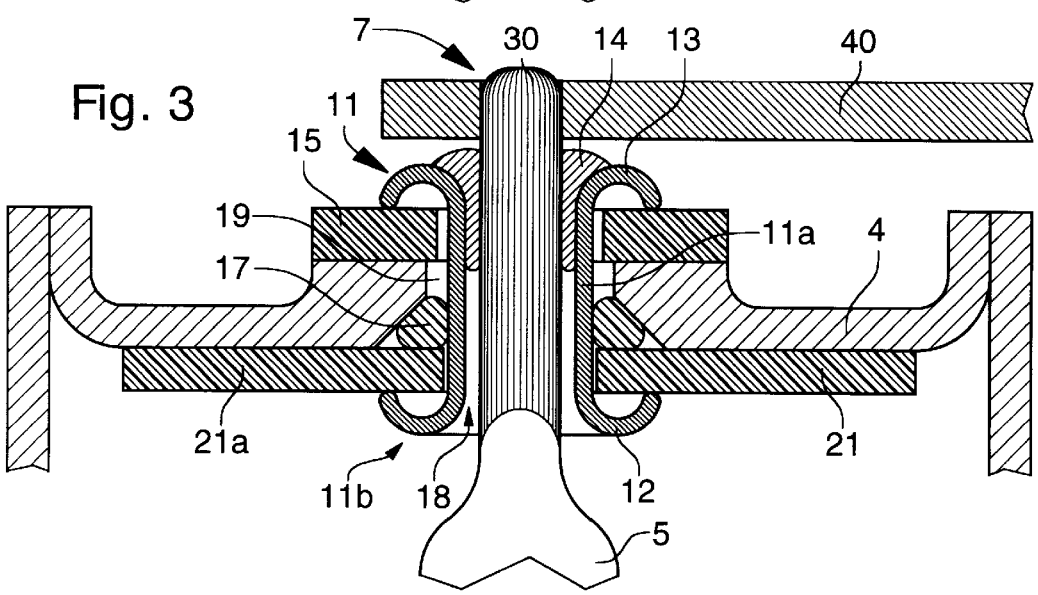
FIG. 3 is a cross-section of a second embodiment of a safety vent according to the invention.

As shown in FIG. 3, it may be useful or necessary for contact 7 formed by the end of rod 30 to be totally electrically insulated from cover 4. For this purpose, cover 4 has, with respect to tube 11, an annular clearance 19 and the electric insulation is obtained by an insulating washer 15 inserted between cover 4 and crimping bulge 13. It will also be noted that recess 16 formed in cover 4 to accommodate toric joint 17 has a truncated shape, which also contributes to improving the sealing of the battery. FIG. 3 also shows an integrated circuit 40 allowing the safety of use to be reinforced by monitoring the state of charge/discharge, as well as any abnormal power demand able to cause an increase in pressure and/or temperature.

In the examples which have just been described with reference to FIGS. 1 to 3, it is seen that tube 11 does not extend within the battery and can be assimilated to a sleeve whose end situated outside the battery is crimped over onto cover 4. In a preferred embodiment, rod 30 conversely extends inside the battery to form a connection means 5 (respectively 6), preferably being flattened over its entire length, this is visible in FIG. 5, so as to make the welding of the electrodes, for example formed of composite strips of active materials, easier.

Figure 4:
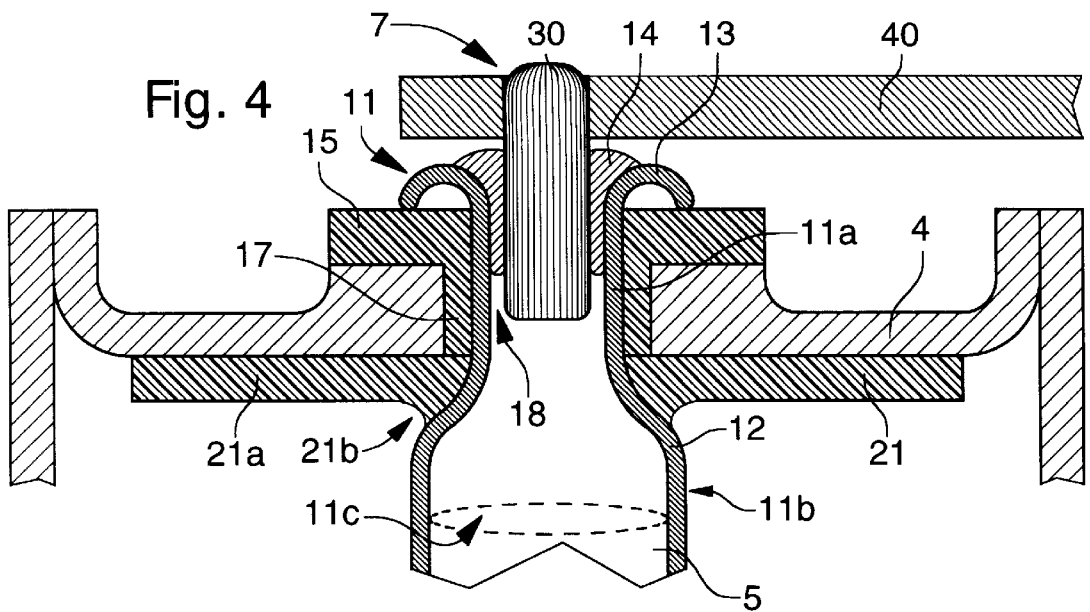
FIG. 4 is a cross-section of a third embodiment of a safety vent according to the invention.

With reference now to the embodiment shown in FIG. 4, it is seen conversely that rod 30 has a length just necessary to be able to arrange a strand of thermofusible composition 14. Further, the portion of larger diameter 11b extends inside the battery to form a connection means 5 (respectively 6) and includes a shoulder 12 resting against inner surface 21a of insulating element 21. As previously, tube portion 11b extends inside the battery can be flattened or squashed to facilitate the welding of the electrodes, while leaving free a passage 11c sufficient to evacuate gases from the lower portion of the tube towards annular clearance 18.

Shoulder 12, which rests on insulating element 21, can originate from the junction between the two portions of a tube initially shaped with a portion of small diameter 11a and a portion of larger diameter 11b. It is also possible to use a tube initially having a uniform diameter corresponding to the smaller diameter 11a, shoulder 12 being then obtained against at least a portion of the opening made in insulating element 21 by crushing the tube which causes the ovalisation thereof. It will be observed that such ovalisation can cause a deformation 21b of the opening made in insulating element 21, such deformation being entirely possible given the material used for said insulating element 21. It will also be observed that insulating washer 15 and gasket 17 form a single part, made of a material which is both insulating and resilient, such as polypropylene to assure both electric insulation and sealing. Gasket 17 then has a tubular shape extending over the entire length of perforation of cover 4.

Figure 5:
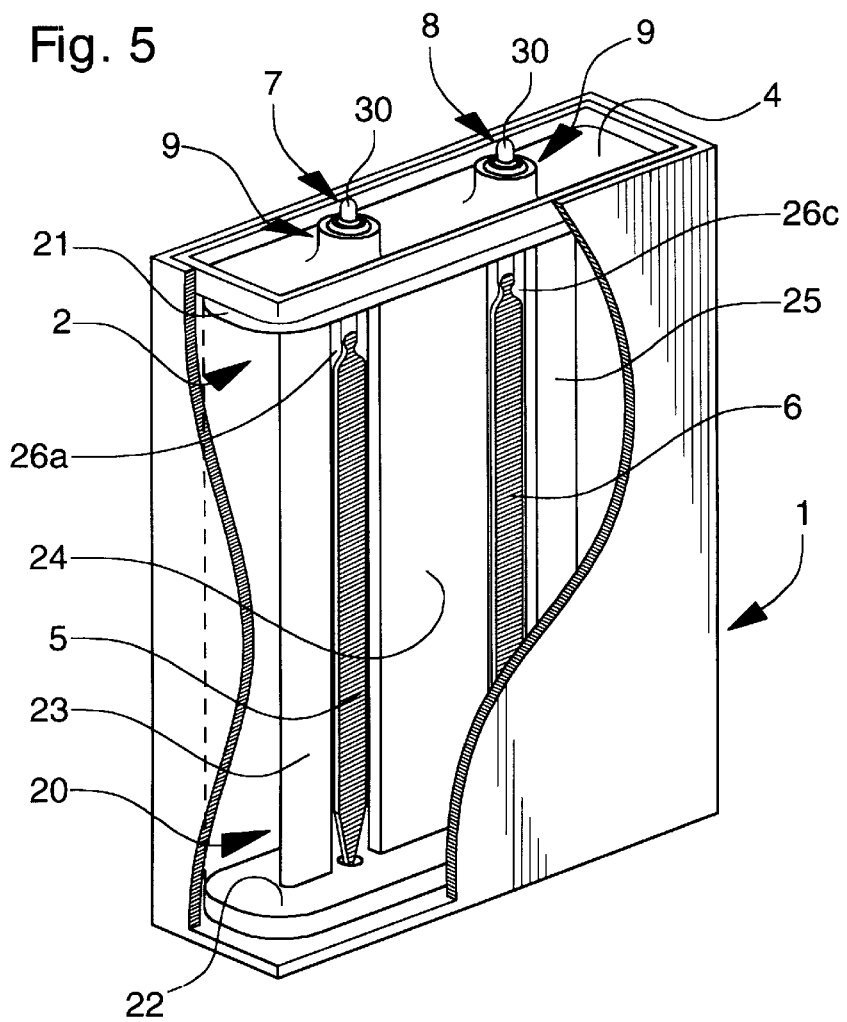
FIG. 5 is an exploded perspective view of a prismatic battery provided with a safety vent according to the invention.

FIG. 5 shows a prismatic battery with a non-circular spiral winding 2, of the jelly roll type, schematically represented by the dotted line, whose two contact terminals 7, 8 are provided with a safety vent 9 of the type of those which have just been described. Such a battery can also be provided with a single vent arranged around one or other of the contact terminals. Spiral winding 2 is formed around a rigid spool 20 made of an insulating material for example plastic, including a lower flange 22 connected to an upper flange 21 by three necks 23, 24, 25 delimiting openings 26a, 26c allowing connection rods 30 to be accommodated, said connection rods being flattened in their median portions to be welded to electrodes 2a, 2c (not shown) of spiral winding 2. As seen, upper flange 21 of spool 20 forms the insulating element against which the shoulder of the tube of a safety vent 9 rests.

The design of the safety vent according to the invention associated with a prismatic battery of the type which has just been described contributes both to increasing the safety of use and to reducing the manufacturing cost, and can be adapted to different types of battery, without departing from the scope of the present invention.

What is claimed is:

1. A safety vent, sensitive to a predetermined temperature, for a battery including a metal container within which are arranged active materials forming respectively an anode and a cathode, said container being sealed at its upper portion by a hermetically sealed cover that is separated from the active materials by an insulating element and carries two contact terminals electrically connected to the anode and the cathode via connection means, said safety vent comprising at least one of the contact terminals formed at least partially by a rigid metal rod and mounted with an annular clearance in a tube, of which one portion of smaller diameter passes through the insulating element and the cover, of which a portion of larger diameter rests against an inner face of the insulating element, and an outer end of which is crimped onto the outer face of the cover, the clearance formed between the tube and the rod being sealed by a solid thermofusible composition having a melting point at said predetermined temperature.

2. A vent according to claim 1, wherein the tube forms a sleeve whose shoulder forms a flange resting on the inner face of the insulating element and wherein the rod is extended inside the battery beyond the insulating element to form a connection means without any intermediate contact with the electrodes.

3. A vent according to claim 1, wherein the rod does not extend beyond the insulating element, wherein the portion of the tube of greater diameter extends inside the battery to form a connection means with the electrodes, and wherein the thermofusible composition is electrically conductive.

4. A vent according to claim 1, wherein a portion of the rod or the tube extends inside the battery to form the connection means, and the extended portion is flattened or squashed.

5. A vent according to claim 1, wherein an insulating washer is arranged on the external face of the cover to act as support for the crimped end of the sleeve.

6. A vent according to claim 1, wherein the cover is further provided with an annular recess which is open in the direction of the insulating element to accommodate a gasket compressed by crimping between the cover, the insulating element and the portion of the tube of smaller diameter.

7. A vent according to claim 6, wherein an insulating washer is arranged on the external face of the cover to act as support for the crimped end of the sleeve, and wherein the insulating washer and the gasket form a single part.

8. A vent according to claim 1, wherein the insulating element is rigid and forms the upper flange of a spool having a lower flange joined to said upper flange by three necks defining two openings therebetween, and supporting a non circular spiral winding including the anode and the cathode.

9. A vent according to claim 8, wherein the metal rods or the tubes of two of said safety vent terminals form connection means that pass through the spool and are housed in the openings arranged between the necks.

10. A vent according to claim 1, wherein the thermofusible composition is a eutectic alloy of metals and has a melting point between 100° C. and 150° C.

11. A battery provided with the safety vent, sensitive to the predetermined temperature, according to claim 1.

12. A prismatic battery provided with the safety vent, sensitive to the predetermined temperature, according to claim 1.

13. A vent according to claim 1, wherein the thermofusible composition is electrically conductive and forms an electric bridge between the tube and the rod.

14. A vent according to claim 1, wherein the thermofusible composition is a eutectic alloy of metals, and the metals are selected from among tin, bismuth, lead, cadmium and indium.

* * * * *